United States Patent
Boliek et al.

(10) Patent No.: US 12,309,153 B2
(45) Date of Patent: May 20, 2025

(54) SECURE PRIVATE NETWORK NAVIGATION

(71) Applicant: Goodwell Technologies, Inc., Bellevue, WA (US)

(72) Inventors: David Boliek, Carnation, WA (US); John Cofano, Sammamish, WA (US); Phillip Dellinger, Bothell, WA (US)

(73) Assignee: GOODWELL TECHNOLOGIES, INC., Bellevue, WA (US)

( * ) Notice: Subject to any disclaimer, the term of this patent is extended or adjusted under 35 U.S.C. 154(b) by 0 days.

(21) Appl. No.: 18/642,161

(22) Filed: Apr. 22, 2024

(65) Prior Publication Data

US 2024/0275788 A1 Aug. 15, 2024

Related U.S. Application Data

(63) Continuation of application No. 17/488,816, filed on Sep. 29, 2021, now Pat. No. 11,997,093.

(60) Provisional application No. 63/085,731, filed on Sep. 30, 2020.

(51) Int. Cl.
| | |
|---|---|
| *G06F 15/16* | (2006.01) |
| *G06F 9/54* | (2006.01) |
| *H04L 9/40* | (2022.01) |
| *H04L 29/06* | (2006.01) |

(52) U.S. Cl.
CPC .................................... *H04L 63/10* (2013.01)

(58) Field of Classification Search
CPC ....................................................... H04L 63/10
USPC ............................................................. 726/9
See application file for complete search history.

(56) References Cited

U.S. PATENT DOCUMENTS

| | | | | |
|---|---|---|---|---|
| 7,137,006 B1* | 11/2006 | Grandcolas | ......... | H04L 63/0815 713/180 |
| 7,356,711 B1* | 4/2008 | Calinov | ................ | H04L 9/3226 713/180 |
| 8,276,190 B1* | 9/2012 | Chang | ................. | H04L 63/0815 713/176 |
| 8,490,168 B1* | 7/2013 | Holloway | ........... | H04L 63/0815 726/8 |
| 2005/0166051 A1* | 7/2005 | Buer | ..................... | H04L 9/3263 713/173 |
| 2006/0212434 A1* | 9/2006 | Crawford | .............. | G06F 16/957 |
| 2007/0198741 A1* | 8/2007 | Duffy | .................... | G06F 16/957 707/E17.116 |
| 2013/0081125 A1* | 3/2013 | Ho | ..................... | H04L 67/1027 726/8 |

(Continued)

*Primary Examiner* — Hamza N Algibhah
(74) *Attorney, Agent, or Firm* — HSML P. C.

(57) ABSTRACT

A secure network navigation system includes a secure network portal and a site-to-site authenticator. The secure network portal includes a network authenticator to authenticate a user's browser connection to access content at a first site on the secure network. The site-to-site authenticator creates an object that authenticates the user's browser connection, creates a transfer URL by which the user is to access content on a second site of the plural network sites on the secure network. The transfer URL includes values exported from the created object and a unique transfer token. The site-to-site authenticator then transfers the user's browser connection to an address corresponding to the transfer URL. The secure navigation from the first site to the other site on the secure network is transparent to the user.

11 Claims, 6 Drawing Sheets

(56) References Cited

U.S. PATENT DOCUMENTS

| | | | |
|---|---|---|---|
| 2013/0347071 A1* | 12/2013 | Polo Moragon | H04L 63/0853 726/3 |
| 2015/0326672 A1* | 11/2015 | Chandwani | H04L 67/141 709/227 |
| 2015/0373005 A1* | 12/2015 | Deurbrouck | H04L 67/02 726/9 |
| 2016/0253521 A1* | 9/2016 | Esmailzadeh | G06F 21/602 726/4 |
| 2017/0180496 A1* | 6/2017 | Comstock | H04L 67/146 |
| 2017/0339248 A1* | 11/2017 | Karalis | H04L 63/1433 |
| 2017/0374057 A1* | 12/2017 | Petrovichev | H04L 63/0823 |
| 2019/0034547 A1* | 1/2019 | Kim | H04L 67/563 |
| 2019/0097996 A1* | 3/2019 | Gong | H04L 63/0884 |
| 2019/0130134 A1* | 5/2019 | Gonzalez Sanchez | H04L 63/0421 |
| 2019/0222570 A1* | 7/2019 | Krishan | G06F 21/45 |
| 2020/0027134 A1* | 1/2020 | Herling | G06Q 30/0277 |
| 2021/0105267 A1* | 4/2021 | Brown | G06F 21/6218 |

\* cited by examiner

SECURE PRIVATE NETWORK NAVIGATION

CROSS-REFERENCE TO RELATED APPLICATIONS

This application is a Continuation of U.S. application Ser. No. 17/488,816, filed Sep. 29, 2021, which claims priority to and the benefit of U.S. Provisional Application No. 63/085,731, filed Sep. 30, 2020, the entire contents of which are incorporated herein by reference.

TECHNICAL FIELD

The embodiments described and recited herein pertain generally to securely authenticating members by all network sites corresponding to a secure private network.

BACKGROUND

A Private Marketplace (Secure Private Network) may have associated Network Sites (including websites or other endpoints, like chat, SMS, etc.), on the order of several to hundreds, provided by partners or suppliers, e.g., vendors. Because it is a secure private network, each network site must authenticate an arriving user prior to authorizing use of the site and unlocking the site for the user.

SUMMARY

In accordance with at least one example embodiment of secure private network navigation described and recited herein, a method of navigating between private sites on a secure network includes: at each private site on the secure network: assigning respective routing codes to transfer a subscribing member's secure connection to another private site on the secure network, and directing the subscribing member's secure connection to a portal site on the secure network; at the portal site on the secure network: matching a routing code received from a transferring private site on the secure network to a stored unique URL to transfer the subscribing member's secure connection to the other private site, encoding the unique URL for the other private site using values from a stored cookie for the subscribing member's secure connection, and directing the subscribing member's secure connection to the unique URL for the other private site; and at the other private site on the secure network: decoding the unique URL, validating a transfer token that is secured in connection with the unique URL, and granting access to the content thereon to the subscribing member's secure connection.

In accordance with at least one other example embodiment described and recited herein, a secure network navigation system includes a secure network portal and a site-to-site authenticator. The secure network portal includes a network authenticator to authenticate a user's browser connection to access content at a first site on the secure network. The site-to-site authenticator creates an object that authenticates the user's browser connection, creates a transfer URL by which the user is to access content on a second site of the plural network sites on the secure network. The transfer URL includes values exported from the created object and a unique transfer token. The site-to-site authenticator then transfers the user's browser connection to an address corresponding to the transfer URL. The secure navigation from the first site to the other site on the secure network is transparent to the user.

In accordance with at least one other example embodiment described and recited herein, computer-readable media store executable instructions that, upon execution, cause one or more processing devices to securely navigate a user's browser connection through a secure private network. The computer-readable media are executed for a first site, a portal site, and a second site, all on the secure network. At the first site, the functions include detecting a request for a transfer of a secure connection to a second network site, generating a routing code pointing to the second site, and transmit the routing code to the portal site. At the portal site, the functions include validating values in an object that authenticates the user's browser connection, creating a transfer URL using the routing code received from the first site and a unique transfer token. The transfer URL is directed to the second site by transferring values from the user's private network cookie into a masked string for the URL, and transferring the user's connection, including the routing code, to the second network site that corresponds to the transfer URL. At the second site, the functions include decrypting the transfer URL to the second network site, validating the transfer token, and providing access to all content on the second network site to the user's browser connection.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1A:
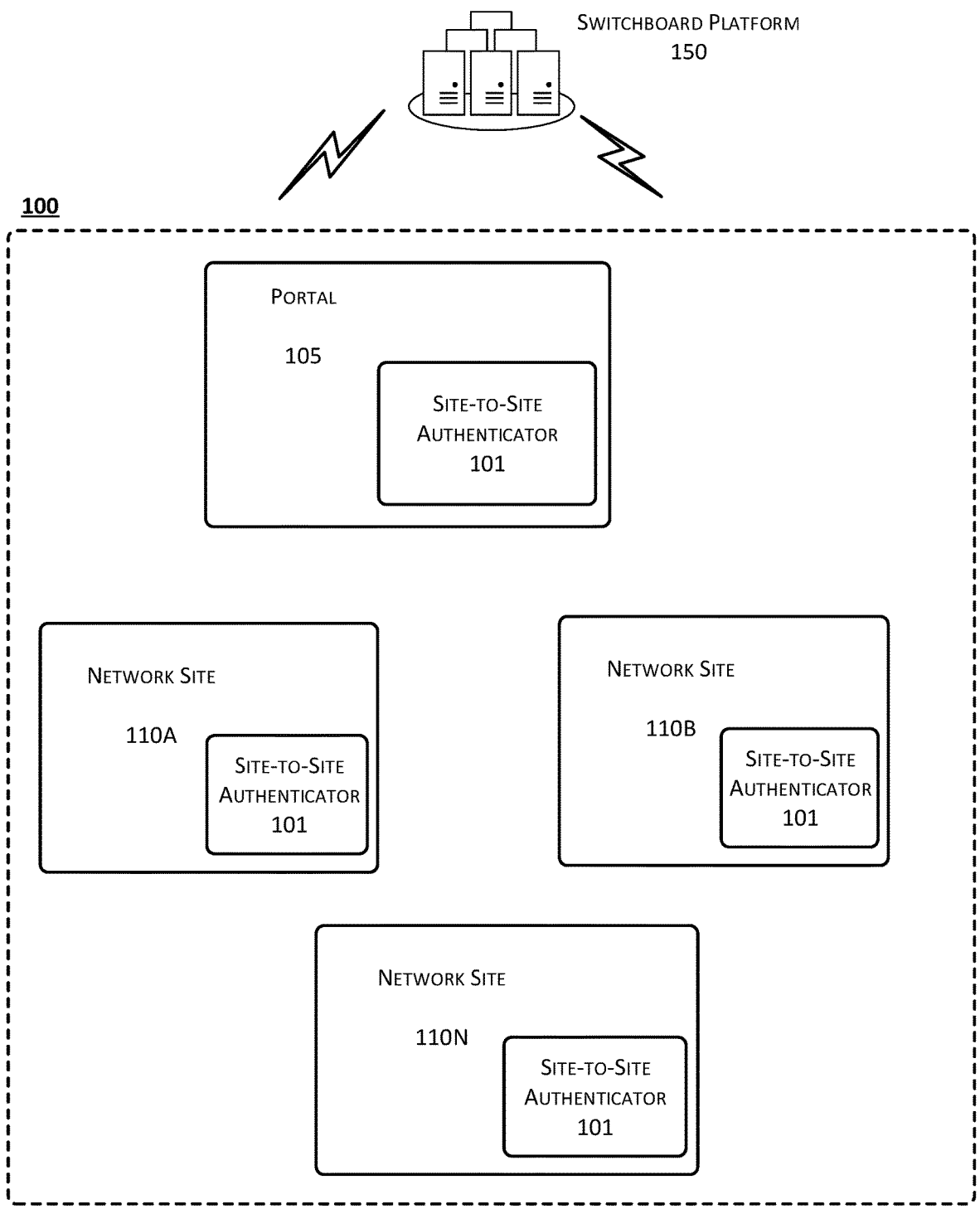
FIG. 1A shows a block diagram of nodes in a private network in which a user's connection may securely navigate, in accordance with at least some embodiments described and recited herein.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Described and recited herein are apparatuses, systems, methods, and programs pertaining to secure member authentication by network sites within a secure private network. In accordance with embodiments described and recited herein, unique transfer tokens may be passed to network sites within the secure private network, utilizing routing code that identifies a source network site and a target network site, a cookie, i.e., object, that authenticates a user's browser connection on the secure network, and a secured, i.e., encoded and encrypted, URL to which the unique transfer token is attached.

In the present description and recitation, the following terms may be used, in addition to their accepted meaning, as follows:

A transfer may refer to the online presence, i.e., browser connection, of a subscribing member or user, e.g., customer, being moved from one node, i.e., network site to another within a secure private network. Such movement from one node to another may alternatively be referenced herein as "navigation."

A plug-in may refer to a software component that may be added to an existing program or platform and designed, programmed, or otherwise configured to provide support for specific features or functionality. As described and recited herein, a plug-in may include a program that may provide a service, entirely or partially, across multiple nodes of a secure private network. Regardless, collectively, one or more of such plug-ins may be collectively implemented by a single online entity to provide a service, e.g., secure private network navigation.

A portal may refer to a website that serves as a gateway to a secure private network. As described and recited herein, a portal may refer to a professional or business entity, whether individual or corporate, having an online presence, e.g., commerce platform, website, application, i.e., "app", etc., that serves as a reference point for private network sites for professional, commercial, or other business-related purposes.

A portal site registration page may refer to a webpage that may be hosted on a server or other processing device, within the secure private network, and that may be designed, programmed, or otherwise configured to enable a network participant to sign up for an account or sign into an existing account.

A portal site transfer page may refer to a webpage that may be hosted on the portal, and that may be designed, programmed, or otherwise configured to allow a subscribing network member to transfer from one network site to another, within the secure private network, automatically or after activating a transfer button.

A portal site error page may refer to a webpage that may be hosted on the portal, and that may be designed, programmed, or otherwise configured to inform a user of any transfer failures.

A portal site plug-in may refer to executable code that may be installed on the portal site and that may be called by the portal site, and that may be designed, programmed, or otherwise configured to facilitate multiple actions related to secure transfers by the portal, as described and recited herein.

A private network site may refer to a subscribing website within a secure private network, the content of which may be provided only to a subscribing member or user. As described and recited herein, a private network site may also refer to a professional or business entity, whether individual or corporate, having an online presence, e.g., commerce platform, website, application, i.e., "app", etc., that may rely on a portal as a hub for professional, commercial, or other business-related purposes.

A switchboard, as described and recited herein, may refer to a platform-as-a-service that is programmed, designed, or otherwise configured to host, run, and manage programs and/or applications for secure navigation for a subscribing member or user's internet connection between network sites on the private network. Accordingly, as referenced, described, and recited herein, a switchboard platform may refer to one of multiple servers on the order of dozens to hundreds to thousands that may be hosted on a cloud-based infrastructure. The servers corresponding to a switchboard platform may refer to a high-performance computing (HPC) environment that includes, at least, a CPU and GPU. The servers may be configured, designed, or programmed to assemble, manage, compile, and/or execute a program for a secure referral and/or transactional service.

A network site receive transfer page may refer to a webpage, hosted on a respective network site within the secure private network, that may be designed, programmed, or otherwise configured to serve as the target page for transfer for a user for the respective network site.

A network site error page may refer to a webpage that may be hosted on a respective network site within the secure private network, and that may be designed, programmed, or otherwise configured to inform a user information of any transfer failures.

A network site plug-in may refer to executable code that may be installed on a respective network site within the secure private network, that may be called by the respective network site, and that may be designed, programmed, or otherwise configured to facilitate multiple actions related to the secure transfers within the secure private network, as described and recited herein.

Routing code may refer to an object, utilized in the transfer from one network to another, sent from an origin site to the portal site that identifies the origin network site and also the target network site. The portal site may utilize the routing code when constructing a transfer URL, using an identifier for the target network site. The switchboard may utilize the target site identifier to forward the connection on to the target site with a URL formatted to the target network site's configuration, and the switchboard may create a unique transfer token to be validated by the target network site. The origin site identified by the routing code is not limited to network sites on the secure private network. Rather, the origin site identified by the routing code may be an application ("app"), a non-secure website, a QR code, etc., though the target site, in accordance with the embodiments described and recited herein, is a network site on the private network.

A cookie may refer to an object, e.g., web cookie, Internet cookie, and/or session cookie, that includes predefined information pertaining to a subscribing member or user that has been validated on a portal site registration page at the portal to the private network. The cookie may be valid for a length of time predetermined in a configuration for the portal, and may be stored on the portal. In accordance with embodiments described and recited herein, data, or portions thereof, pertaining to a respective cookie may be utilized for secure transfer within the secure private network.

FIG. 1A shows a block diagram of sites within a private network in which a subscribing member or user's connection may securely navigate, in accordance with at least some embodiments described and recited herein. As depicted within FIG. 1A, private network 100 includes portal 105, and network sites 110A, 110B, . . . , 110N. Each of portal site 105 and network sites 110A, 110B, . . . , 110N may have site-to-site authenticator 101 installed or plugged-in, entirely, partially, or customized therefor.

The number of network sites 110A, 110B, . . . , 110N within private network 100 is not bounded, but the description and recitations provided herein pertain to the transfer of a subscribing member or user's secure browser connection from one network site to another. Therefore, unless context otherwise requires, reference herein may be made regarding the transfer from network site 110A to network site 110B, with the understanding that the transfer may be between any two of network sites 110A through 110N. Also, again unless context otherwise dictates, a description and/or recitation pertaining to an individual one of the network sites may be made with reference to a singular network site 110 or, in the general sense, network sites 110.

In accordance with non-limiting example embodiments described and recited herein, an administrator tool or component at portal 105 may utilize a configuration module to install and test site-to-site authenticator 101; and, an administrator tool or component at each respective one of network sites 110 may also utilize a configuration module to install and test site-to-site authenticator 101.

FIG. 1A further includes switchboard platform 150, which may be designed, programmed, or otherwise configured to facilitate secure navigation of a subscribing member or user's internet presence, i.e., browser connection, between network site 110A and network site 110B by validating and redirecting transfer requests to a desired or intended private network site endpoint. Further, switchboard 150 may be implemented as part of a cloud-based infrastructure that is connected to, at least, portal 105 and each of network sites 110, via a wired network or direct-wired connection or, additionally or alternatively, via a wireless connection using any one of various wireless protocols. Further still, switchboard 150 may provide an application programming interface (API) that may be called by site-to-site authenticator 101 installed, plugged-in, or otherwise connected to respective network sites 110 to validate an inbound transfer connection. Accordingly, switchboard platform 150 is at least a partial facilitator of secure private network navigation.

Figure 1B:
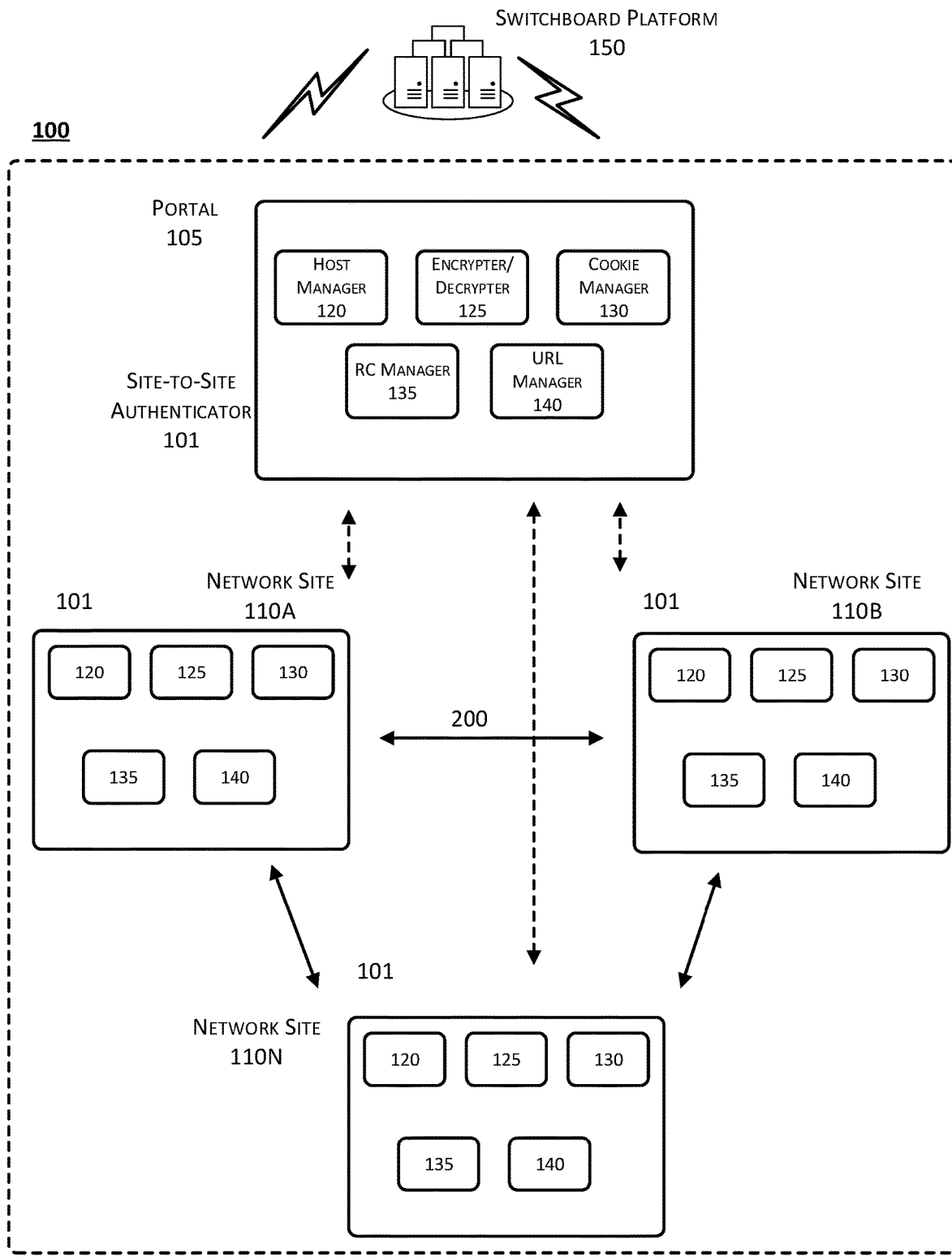
FIG. 1B shows a more detailed version of the block diagram of nodes in a private network in which a user's connection may securely navigate, in accordance with at least some embodiments described and recited herein.

FIG. 1B shows a more detailed version of the block diagram of nodes in private network 100, in which a subscribing member or user's browser connection may securely navigate, in accordance with at least some embodiments described and recited herein. As depicted within FIG. 1B, further to FIG. 1A, respective versions of site-to-site authenticator 101 at portal 105 and each of network sites 110 include, at least, host manager 120, encrypter/decrypter 125, cookie manager 130, routing code manager 135, and URL manager 140. Further, switchboard 150 may be implemented as part of a cloud-based infrastructure that is connected to at least portal 105 and each of network sites 110, as described above.

Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. Further, although described and recited herein as being a plug-in to portal 105 and/or network sites 110, site-to-site authenticator 101 may be implemented as a program installed of each of portal 105 and network sites 110 or as a cloud-based service, i.e., program, hosted on a remote server to be executed in portal 105 and network sites 110. Further still, site-to-site authenticator 101 may be implemented as a program or plug-in that is customized for portal 105 and, separately, for network sites 110.

Host manager 120 may refer to a component that may be designed, programmed, or otherwise configured to: implement set up for site-to-site authenticator 101 and its host, i.e., port 105 or network site 110, in accordance with known interfacing protocols; and also facilitate communications with the host, e.g., detect a request for a transfer from a subscribing member or user having a secure online presence on network site 110A to network site 110B, and inform network site 110B when the browser connection for the transferring member or user has been authorized for access to the content thereon.

In accordance with one or more non-limiting embodiments described and recited herein, host manager 120 may implement set up in connection with portal 105 by providing encryption keys for encrypter/decrypter 125 for encrypting URL parameters, a transfer page base address for switchboard 150, a mask for a transfer URL parameter string format, and a listing of routing code for each of network sites 110A through 110N. Thus, site-to-site authenticator 101, in connection with portal 105, may provide parameters for transfer requests from one network site to another to be processed on private network 100.

In accordance with one or more non-limiting embodiments described and recited herein, host manager 120 may implement set up in connection with network sites 110 by providing shared encryption keys for encrypter/decrypter 125 for encrypting URL parameters, a network site transfer page base address for every other one of network sites 110 on private network 100, a mask for a transfer URL parameter string format, a specification for calling an API to validate transfer tokens. Thus, site-to-site authenticator 101, in connection with each respective one of network sites 110, may provide parameters for transfer requests from one network site to another, on private network 100, to be processed.

Encrypter/decrypter 125 may refer to a component that may be designed, programmed, or otherwise configured to encrypt and decrypt cookies and transfer tokens, as appropriate, to maintain the security and privacy of identifiable information for a subscribing member or user on private network 100.

Cookie manager 130 may refer to a component that may be designed, programmed, or otherwise configured to validate and/or generate a cookie or authenticating object for a subscribing member's or user's connection on private network 100.

Routing code manager 135 may refer to a component that may be designed, programmed, or otherwise configured to generate a unique routing token on site-to-site authenticator 101 at portal 105.

URL manager 140 may refer to a component that may be designed, programmed, or otherwise configured to generate a transfer URL for network site 110B, on site-to-site authenticator 101 at portal 105.

Figure 2:
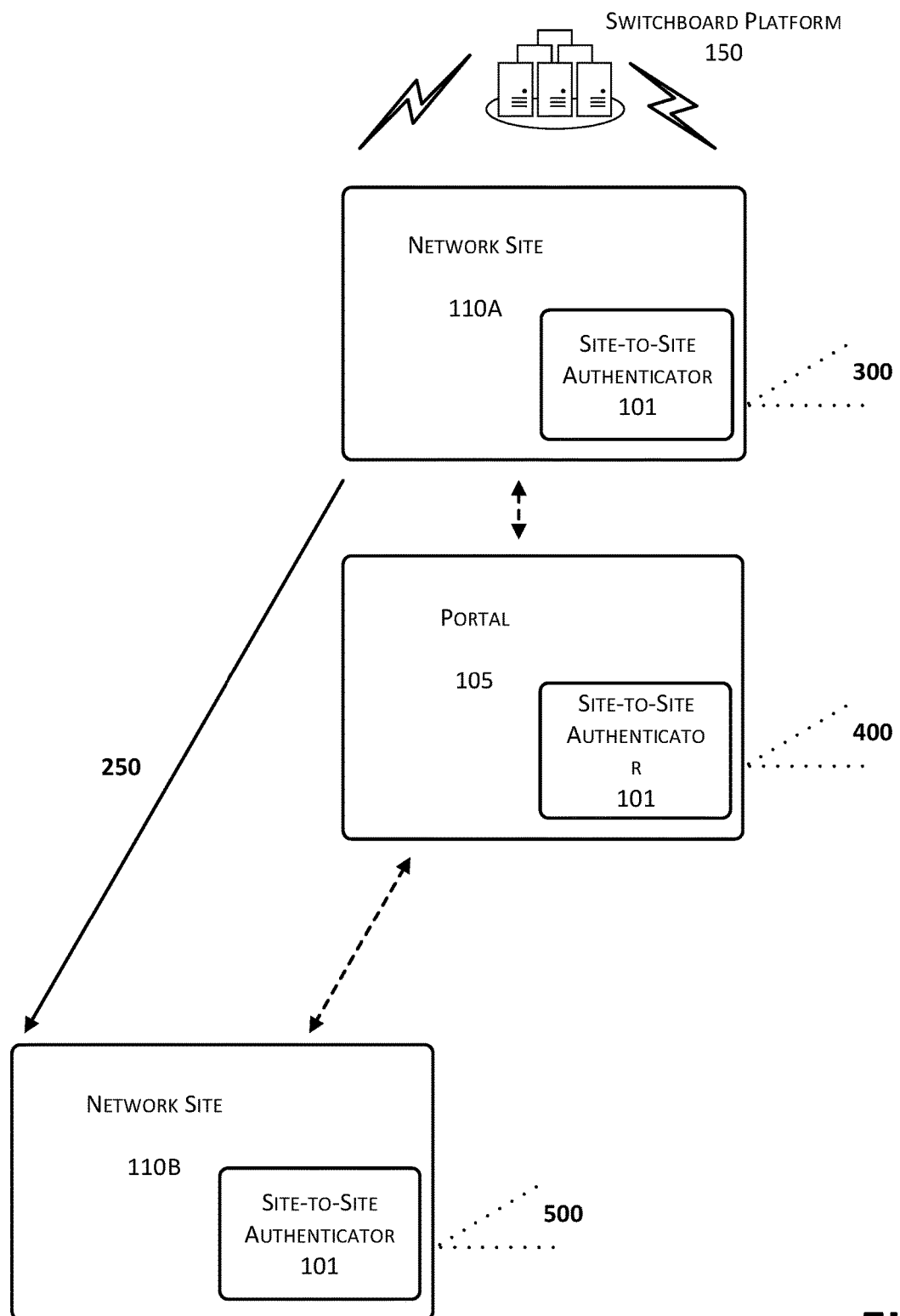
FIG. 2 shows a block diagram that provides an overview of navigation from one network site to another within a secure private network, in accordance with at least some embodiments described and recited herein.

FIG. 2 shows a block diagram that provides an overview of navigation from one network site to another within a secure private network, in accordance with at least some embodiments described and recited herein.

Generally, in accordance with non-limiting example embodiments described and recited herein, a subscribing member or user's online presence at network site 110A may be transferred to network site 110B, at the request of the subscribing member or user, via portal 105. However, the intervention site-to-site authenticator 101 at portal 105 for the transfer from network site 110A to network site 110B, represented by the dashed arrows in FIG. 2, may be transparent to the subscribing member or user. Rather, the subscribing member or user may experience, at least visually, direct navigation from network site 110A to network site 11B, as represented by the solid arrow 250.

Processing 300 pertains to operations performed by site-to-site authenticator 101 at network site 110A, at which a transfer request may be activated by a subscribing member or user having an online presence, i.e., a secure browser connection, at network site 110A, and will be described further below with reference to FIG. 3.

In accordance with at least some example embodiments, at network site 110A, a user may activate, e.g., click, a URL link indicating a request to navigate from network site 110A to network site 110B. The activation of the URL link may be detected at portal 105, and the user's browser connection may then be directed thereto.

Generally, though, at portal 105, host manager 120 may determine whether or not the user's browser connection has a valid cookie to support the user's browser connection on secure network 100, using known known technologies for scanning or checking for cookies.

In accordance with other alternative embodiments described, recited, and even contemplated herein, the data associated with a private site cookie may be provided and stored as a cookie, on the local storage of the subscribing user's browser, or as session storage. That is, in addition to known implementations of a cookie, the embodiments described and recited herein may also incorporate a local storage object or a session storage object on the portal site to store predefined information pertaining to a subscribing member or user that has been validated on a portal site registration page at the portal to the private network. Thus, the embodiments described and recited herein may utilize such implementations interchangeably or even in various combinations thereof. However, for the sake of simplicity of explanation, the term cookie will be referenced herein, with the understanding that the aforementioned local storage object or session storage object may be used in addition or interchangeably.

If the user's browser connection is not determined to be supported by a valid cookie, the user's browser connection may be directed to a portal site error page which may direct the user's browser connection to an authentication workflow at portal 105.

If the user's browser connection is determined to be supported by a valid cookie, host manager 120 may prompt URL manager 140 to generate a redirect transfer URL to direct the subscribing member or user's browser connection to switchboard 150, via site-to-site authenticator 101 corresponding to portal 105.

At switchboard 150, as described further below, new URL may be generated to direct the browser connection to network site 110B, and a unique transfer token may be generated and attached to the URL. Then, the user's browser connection may be directed to network site 110B.

Processing 400 pertains to operations performed by site-to-site authenticator 101 at portal 105, through which a transfer request by a browser connection for a subscribing member or user on secure network 100 may be routed. That is, as set forth above regarding processing flow 300, the activation of the URL link may be detected at portal 105, and the user's browser connection may then be directed to portal 105. Processing flow 400 will be described further below with reference to FIG. 4.

Generally, though, in accordance with at least some example embodiments, the URL link detected at portal 105 may include routing code that identifies network site 110A and network site 110B, intended to direct the user's browser connection from network site 110A to network site 110B.

At portal 105, cookie manager 130 may create an encrypted private site cookie that includes, at least, predefined information pertaining to the subscribing member or user that has been validated on the portal site registration page. The cookie may be valid for a length of time predetermined in a configuration for portal 105.

Encrypter/decrypter 125 may encrypt the cookie.

URL manager 140 may then generate a transfer URL intended to direct the browser connection for the subscribing member or user to switchboard platform 150 where a unique transfer token may be generated. In accordance with at least some example embodiments, URL manager 140 may do so utilizing a URL configuration mask definition to form the URL by transferring values from the cookie as well as the routing code into the masked values in the URL string and attaching the unique transfer token thereto.

At switchboard platform 150, the routing code that is included in the masked URL may be referenced to a routing table thereon. The routing table may include URLs that may be utilized to direct a validated browser connection for a subscribing member or user to a specified one of network sites 110A-110N. In accordance with at least some non-limiting examples, the routing table may include URLs that may be utilized to direct a validated browser connection for a subscribing member or user from a specified one of network sites 110A-110N to another specified one of network sites 110A-110N. That is, at switchboard platform 150, the subscribing user's connection is forwarded to the targeted network site in accordance with a URL that is formatted to a configuration for the network site 110B, and a unique transfer token may be created and included in the URL string, which is encrypted.

At switchboard platform 150, a unique transfer token may be created after receiving the connection generated by URL manager 140. The URL parameter may be decrypted and validated. Upon successful validation, a GUID or UUID may be generated, and the received parameter data may persist as a new transfer object referenced by the generated GUID. The GUID is then used as a parameter on the transfer URL that is generated to forward the user connection on to target network site. The target network site upon receipt of the connection would check that a valid transfer token has been received. This check is done via an http request back to the switchboard requesting that the switchboard validates the GUID received by the target site.

Routing code manager 135 of site-to-site authenticator 101 corresponding to portal 105 may then direct the browser connection for a subscribing member or user from switchboard platform 150 to network site 110B.

Processing 500 pertains to operations performed by site-to-site authenticator 101 at network site 110B, to which the browser connection for the subscribing member or user is directed, and will be described further below with reference to FIG. 5.

Generally though, in accordance with at least some example embodiments, at network site 110B, the transfer of the browser connection for the subscribing member or user may be acknowledged on the corresponding network site receive transfer page. Further, as the transfer is accepted, host manager 120 of site-to-site authenticator 101 on network site 110B may facilitate full access of the content of network site 110B to the browser connection for the subscribing member or user.

Figure 3:
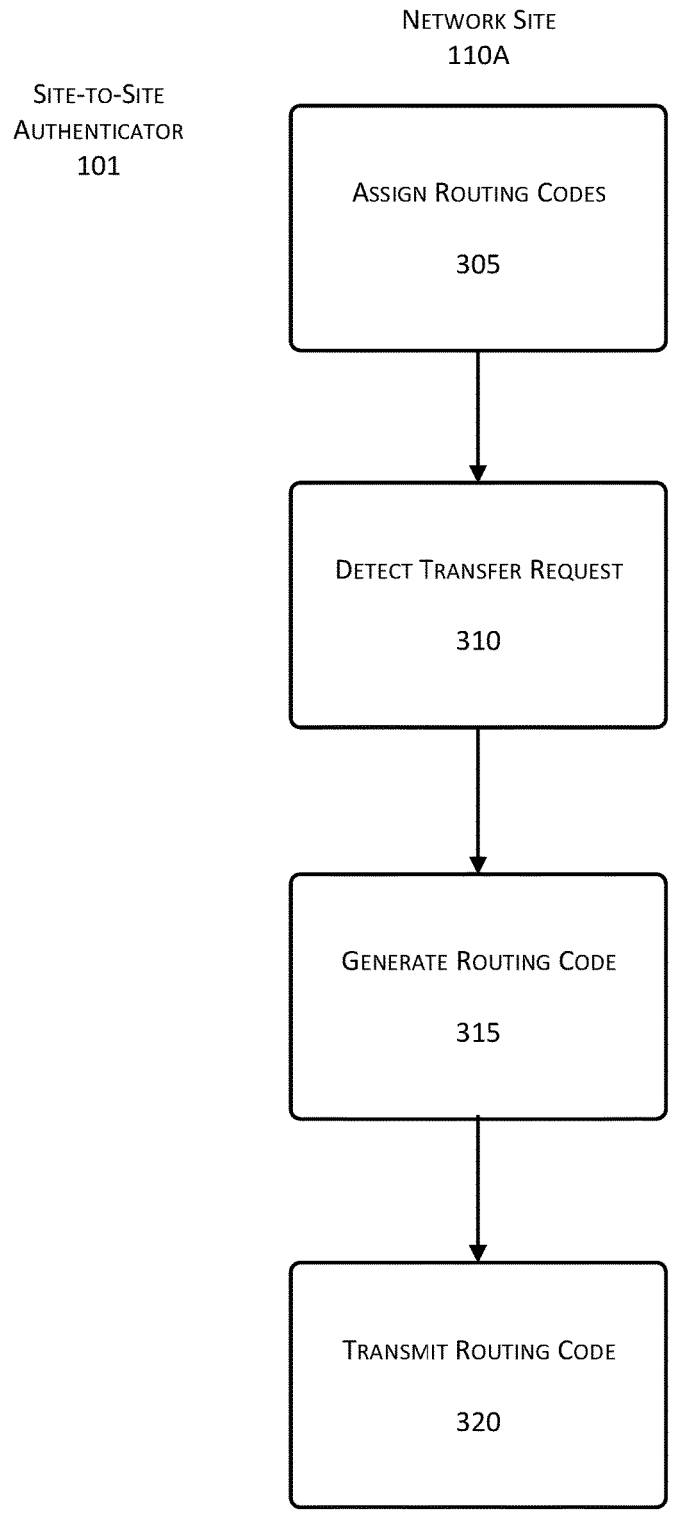
FIG. 3 shows a processing flow in a network site from which a transfer request for a user's secure connection is activated, in accordance with at least some embodiments described and recited herein.

FIG. 3 shows a processing flow in a network site from which a transfer request for a user's secure connection is activated, in accordance with at least some embodiments described and recited herein. As depicted, processing flow 300, as well as processing flow 400 and processing flow 500, includes functions and/or operations executed by various components of site-to-site authenticator 101 installed or plugged-in at network site 110A. However, processing flow 300 is not limited to such components and operations, as obvious modifications may be made by re-ordering two or more of the sub-operations described herein, eliminating at least one of the sub-operations, adding other sub-operations, substituting components, or even having various components assuming sub-operation roles accorded to other components in the following description. Processing flow 300 may include various operations, functions, or actions as illustrated by one or more of blocks 305, 310, 315, and 320. These various function or operations may, for example, correspond to software, program code, or program instructions included in site-to-site authenticator 101. Processing by site-to-site authenticator 101 on an originating network site, e.g., network site 110A, may begin at block 305.

Block 305 (Assign Routing Codes) may refer to routing code manager 135 receiving or generating routing codes, i.e., routing tokens, that may direct a validated browser connection for a subscribing member or user from network site 110A to a specified one of network sites 110B-110N. According to some non-limiting examples, the routing codes may direct the validated browser connection for a subscribing member or user from any of network sites 110A-110N to another specified one of network sites 110A-110N; or, in the alternative, the respective routing codes may direct the validated browser connection from one specific network site 110 to another specific network site 110. Processing may proceed to block 310.

Block 310 (Detect Transfer Request) may refer to host manager 120 detecting the activation, e.g., clicking, of a link by a user on a link intended to direct the user's browser connection on secure network 100 to another one of network sites 110, e.g., 110B. Processing may proceed to block 315.

Block 315 (Generate Routing Code) may refer to routing code manager 135 that identifies network site 110B as the intended network site, i.e., network site receive transfer page for network site 110B, for the transfer from network site 110A. Processing may proceed to block 320.

Block 320 (Transmit Routing Code) may refer to the generated routing code being transmitted from site-to-site authenticator 101 at the originating network site, e.g., network site 110A, to portal 105. Processing may proceed to processing flow 400.

Figure 4:
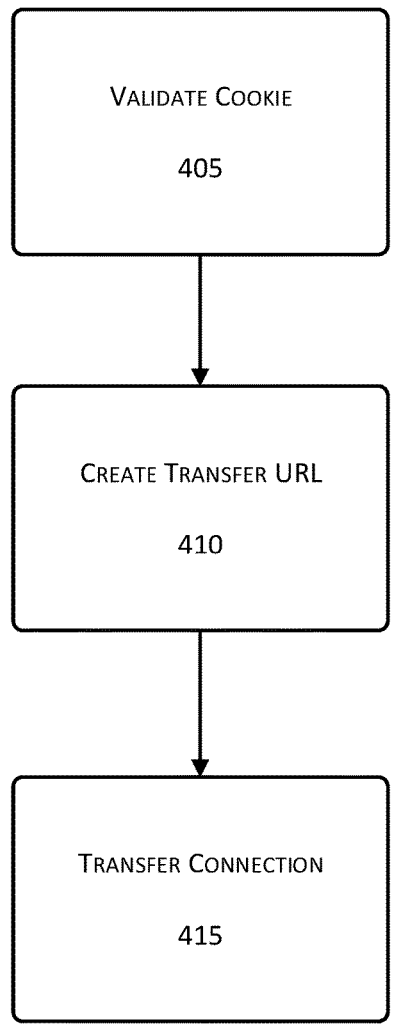
FIG. 4 shows a processing flow in a portal site to facilitate fulfillment of a transfer request from one network site to another within a secure private network, in accordance with at least some embodiments described and recited herein.

FIG. 4 shows a processing flow at a portal site to facilitate fulfillment of a transfer request from one network site to another within a secure private network, in accordance with at least some embodiments described and recited herein.

Block 405 (Validate Cookie) may refer to cookie manager 130 on site-to-site authenticator 101 at portal 105 checking for a valid cookie for the subscribing member or user whose online presence on private network 100 has been validated on portal 105. If a valid cookie is not found, site-to-site authenticator 101 may create a private network cookie for the subscribing member or user that includes predetermined information pertaining to the subscribing member or user. The private network cookie may then be encrypted by encrypted/decrypter 125. Processing may proceed to block 410.

Block 410 (Create Transfer URL) may refer to URL manager 140 generating a transfer URL that may be transfer the browser connection for the subscribing member or user to switchboard 150. URL manager 140 may utilize a URL configuration mask definition to generate the URL by transferring values from the cookie as well as the routing code into the masked values in the URL string. Processing may proceed to block 415.

Block 415 (Transfer Connection) may refer to routing code manager directing the browser connection to switchboard 150.

At switchboard platform 150, the routing code that is intended to direct the user's browser connection to network site 110B and is included in the masked URL, may be referenced to a routing table thereon. The routing table may include URLs that may be utilized to direct a validated browser connection for a subscribing member or user to a specified one of network sites 110A-110N. In accordance with at least some non-limiting examples, the routing table may include URLs that may be utilized to direct a validated browser connection for a subscribing member or user from a specified one of network sites 110A-110N to another specified one of network sites 110A-110N.

Also at switchboard platform 150, the URL may be formatted to a configuration for network site 110B, and a unique transfer token may be created and included in the URL string, which is encrypted.

Routing code manager 135 of site-to-site authenticator 101 corresponding to portal 105 may then direct the browser connection for a subscribing member or user to network site 110B. Processing may proceed to processing flow 500.

Figure 5:
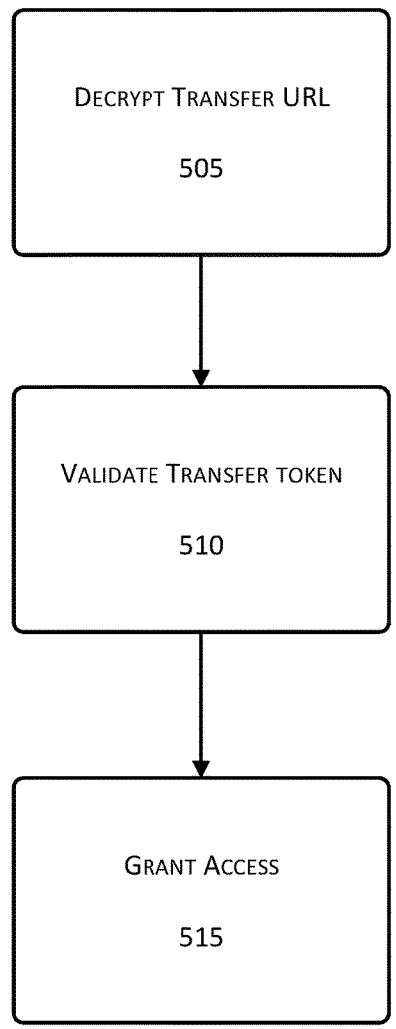
FIG. 5 shows a processing flow in a network site to which a user's secure connection is transferred, in accordance with at least some embodiments described and recited herein.

FIG. 5 shows a processing flow in a network site to which a user's secure connection is transferred, in accordance with at least some embodiments described and recited herein. Processing may begin at block 505.

Block 505 (Decrypt Transfer URL) may refer to host manager 120 receiving the transfer URL upon the transfer of the browser connection of the subscribing member or user on the network site receive transfer page at network site 110B. Encrypter/decrypter 125 may then decrypt the URL mask to thereby extract the routing code therein that identifies network site 110B as the intended site for transfer from network site 110A. Processing may proceed to block 510.

Block 510 (Validate Routing Code) may refer to RC manager 135 validating the transfer token. If the transfer token is determined to be invalid, the browser connection is directed to the network site error page. Otherwise, processing may proceed to block 515.

Block 515 (Grant Access) may refer to host manager 120 informing an administrator for network site 110B that the browser connection for the subscribing member or user is valid and secure. Thus, host manager 120 may facilitate the subscribing member or user having privileged access to the content at network site 110B.

As set forth above, described and recited herein are methods, programs, systems, apparatuses, and components pertaining to the compilation of a Turing-complete quantum programming language, of which there are no known equivalents for practical quantum computers.

From the foregoing, it will be appreciated that various embodiments of the present disclosure have been described and recited herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A private network on which a secure network navigation is implemented, the private network comprising:
   a server, comprising:
   a processor and
   a secure network portal, comprising:
      a network authenticator to authenticate a subscribing user's browser connection to access content at a first site of plural network sites on the secure network; and
      a site-to-site authenticator to:
         create an object that authenticates the subscribing user's browser connection;
         create a transfer URL, by which the user is to access content on a second site of the plural network sites on the secure network, that includes values exported from the created object and a unique transfer token by matching routing code to a URL stored in a switchboard routing table on the site-to-site authenticator; and
         transfer the subscribing user's browser connection to an address corresponding to the transfer URL to securely navigate from the first site on the secure network to another of the plural network sites on the secure network in a manner that is transparent to the user,
      wherein the site-to-site authenticator is a plug-in to the secure network portal.

2. The private network of claim 1, wherein the site-to-site authenticator is to create the object by incorporating pre-defined parameters pertaining to user information that has been validated by the network authenticator.

3. The private network of claim 1, wherein the site-to-site authenticator is further configured to encrypt the object.

4. The private network of claim 1, wherein the site-to-site authenticator is to create the transfer URL by incorporating the exported values from the object into a defined masked string format for transfer URLs on the private network and attaching the unique transfer token.

5. The private network of claim 4, wherein the site-to-site authenticator is further configured to:
   store all created transfer URLs in a switchboard routing table, and
   wherein each of the respective stored transfer URLs enables the user's browser to securely navigate from a particular one of the plural network sites to another particular one of the plural network sites.

6. The private network of claim 5, wherein the secure navigation between the plural network sites is executed within the secure private network.

7. The private network of claim 1, wherein the site-to-site authenticator is further configured to:
   validate the subscribing user's browser connection on a receiving one of the plural network sites upon transfer from the transferring one of the plural network sites by validating the transfer token received in connection with the transfer URL.

8. The private network of claim 7, wherein navigation of the subscribing user's browser connection on the second network site, transferred from the first network site, is via the secure network portal but transparent to the user.

9. Non-transitory computer-readable media storing executable instructions that, upon execution, cause one or more processing devices to securely navigate a subscribing user's browser connection through a secure private network by performing functions comprising:
   at a first network site:
      detect a request for a transfer of a secure connection to a second network site,
      generate a routing code pointing to the second network site, and
      transmit the routing code to the portal site;
   at the portal site:
      validate values in an object that authenticates the subscribing user's browser connection,
      create a transfer URL, using the routing code received from the first network site, to the second network site by transferring values from the object into a masked string for the URL and a unique transfer token, and
      transfer the user's connection, including, to the second network site that corresponds to the transfer URL; and
   at the second network site:
      decrypt the transfer URL to the second network site,
      validate the transfer token, and
      provide access to all content on the second network site to the subscribing user's browser connection, wherein
      the computer-readable media includes plug-ins to each of the first network site, the portal site, and the second network site, and
      the plug-in at the portal site is to use the routing code to create the transfer URL by matching the routing code to a URL stored in a switchboard routing table on the plug-in.

10. The non-transitory computer-readable media of claim 9, wherein the plug-in at the portal site is to validate values associated with the stored object that authenticates the subscribing user's browser connection, if the stored object has previously expired or is otherwise missing, by creating object that includes therein predetermined information pertaining to the user.

11. The non-transitory computer-readable media of claim 9, wherein the plug-in at the portal site is to validate the stored object by renewing a term therefore.

* * * * *